May 25, 1965  C P LANMON II  3,185,505
DUAL SUSPENSION AND SEAL
Original Filed April 4, 1955  4 Sheets-Sheet 1

C P Lanmon II
INVENTOR.

BY Murray Robinson
ATTORNEY

C P Lanmon II
INVENTOR.

BY Murray Robinson
ATTORNEY

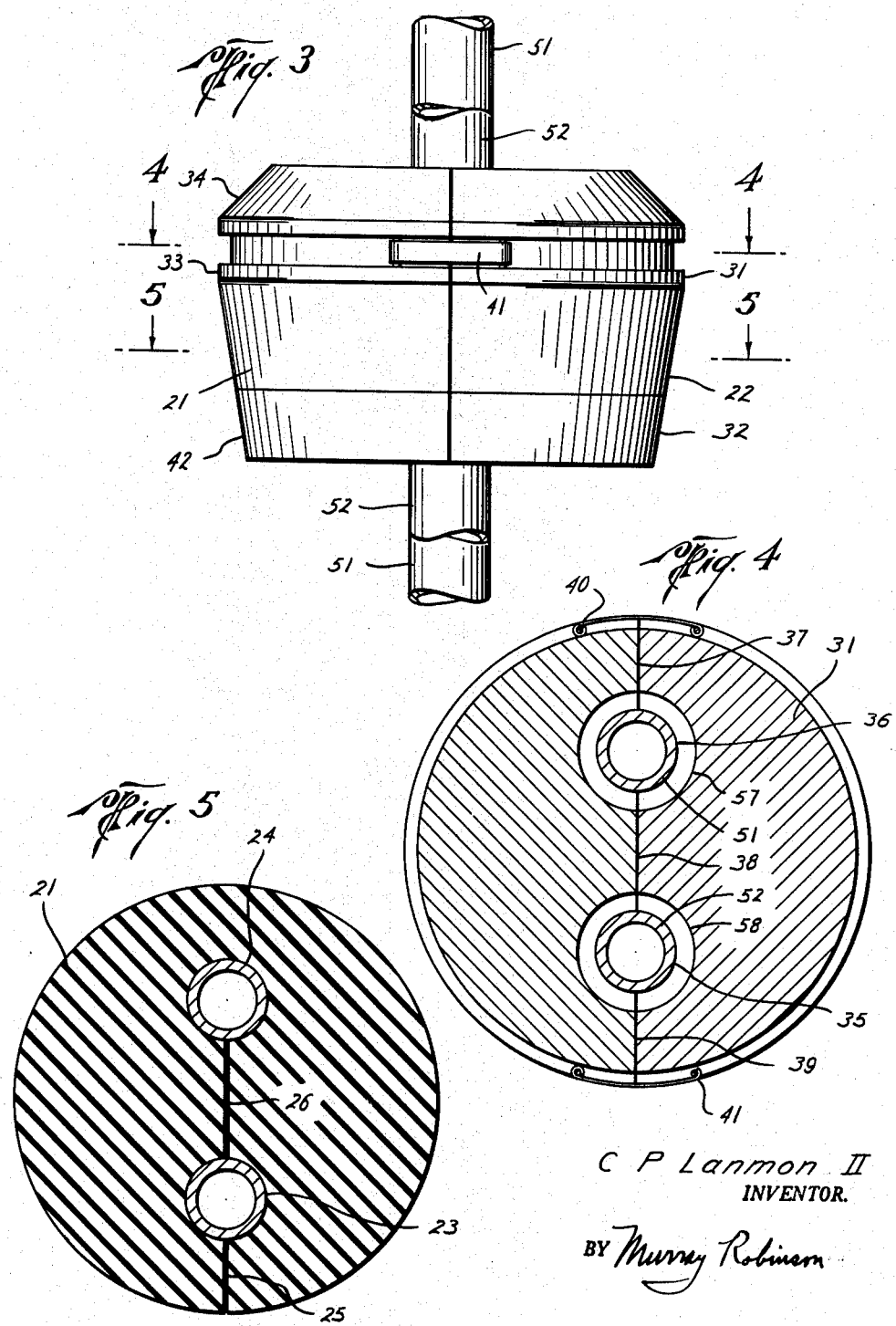

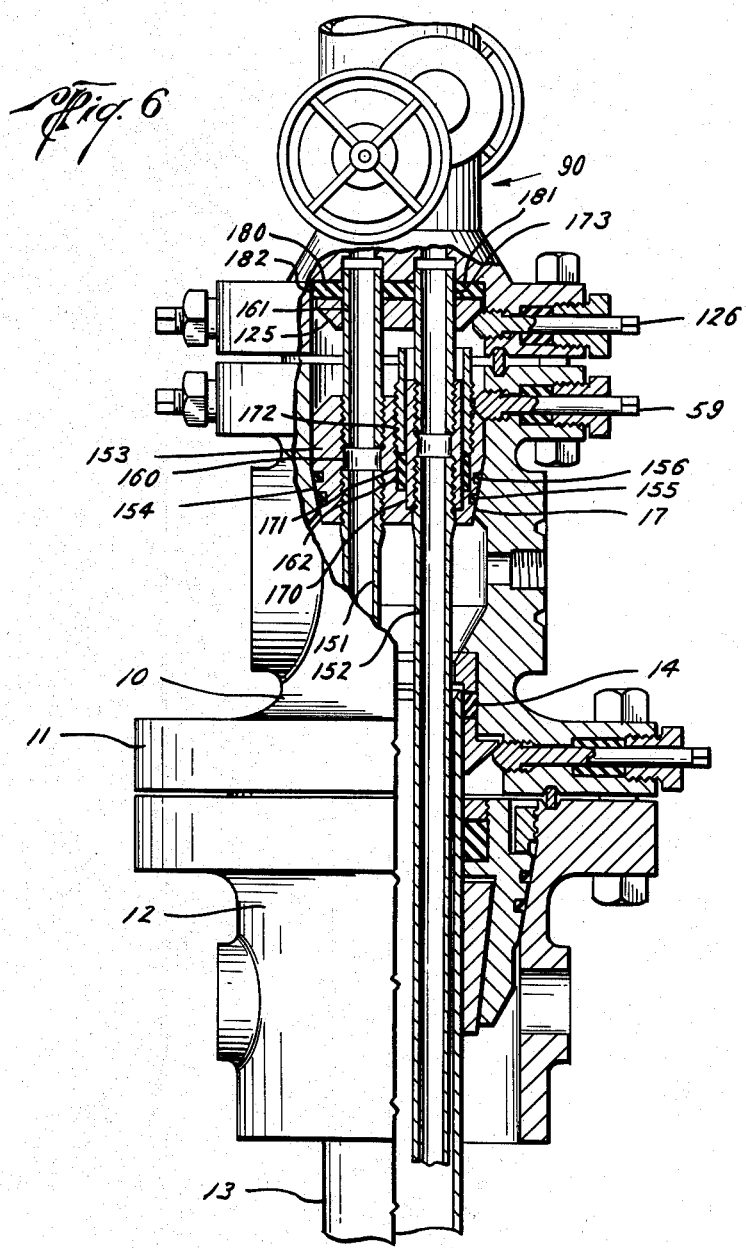

United States Patent Office 3,185,505
Patented May 25, 1965

3,185,505
DUAL SUSPENSION AND SEAL
C P Lanmon II, Galveston County, Tex., assignor, by mesne assignments, to McEvoy Company, Houston, Tex., a corporation of Texas
Original application Apr. 4, 1955, Ser. No. 498,791. Divided and this application Mar. 24, 1961, Ser. No. 126,729
4 Claims. (Cl. 285—137)

This is a division of application Serial No. 498,791 filed April 4, 1955.

This invention pertains to well completion apparatus, and more particularly to such apparatus at the surface of the earth for a parallel string dual completion, that is, for a completion in which the oil or gas may be produced from two different zones and in which two strings of tubing disposed parallel side by side extend respectively from the two production zones to the surface, as distinguished from an ordinary dual completion in which there is but one tubing string and one zone is produced through the annulus between the tubing and casing.

It is desirable to provide in such an apparatus a separate flow passage associated with each string of tubing extending in a straight line all the way to the top of the tree whereby all the usual operations carried on through the tubing during the life of a well can be carried on satisfactorily through each tubing to its particular production zone. It is also desirable in such an apparatus, when there is high pressure in both production zones, that each tubing string and associated flow passage be separated from the outside of the apparatus by high pressure resisting walls up to and through a master valve whereby blowout protection is assured. These two requirements present difficult problems with reference to the sealing and suspension of the two tubings and the surface completion equipment.

A principal object of the invention is to provide a tubing suspension for such an apparatus which will be strong and reliable.

Another object of the invention is to provide a connection between two parallel pipes and a body having two flow passages therethrough, such as a dual valve or dual T, especially adapted for use where the pipes extend from a casing head, adapter flange, valve body, or other supporting means or protecting housing having a flange adapted to be coupled to a similar flange on the dual flow passage valve, T, or other body.

Another object of the invention is to provide a dual tubing head seal for the "annulus" or space between the tubing strings and the tubing head.

Other objects and advantages of the invention will appear from the following description of preferred embodiments thereof, reference being had to the accompanying drawings wherein FIGURES 1 and 2 are side elevations, partly in section, of the lower and upper portions respectively of a tree according to one form of the invention.

FIGURES 3, 4 and 5 are a side elevation and horizontal sections through a seal for the annulus in the tubing head;

FIGURE 6 is a view similar to FIGURE 1 showing a modification.

Figure 1:
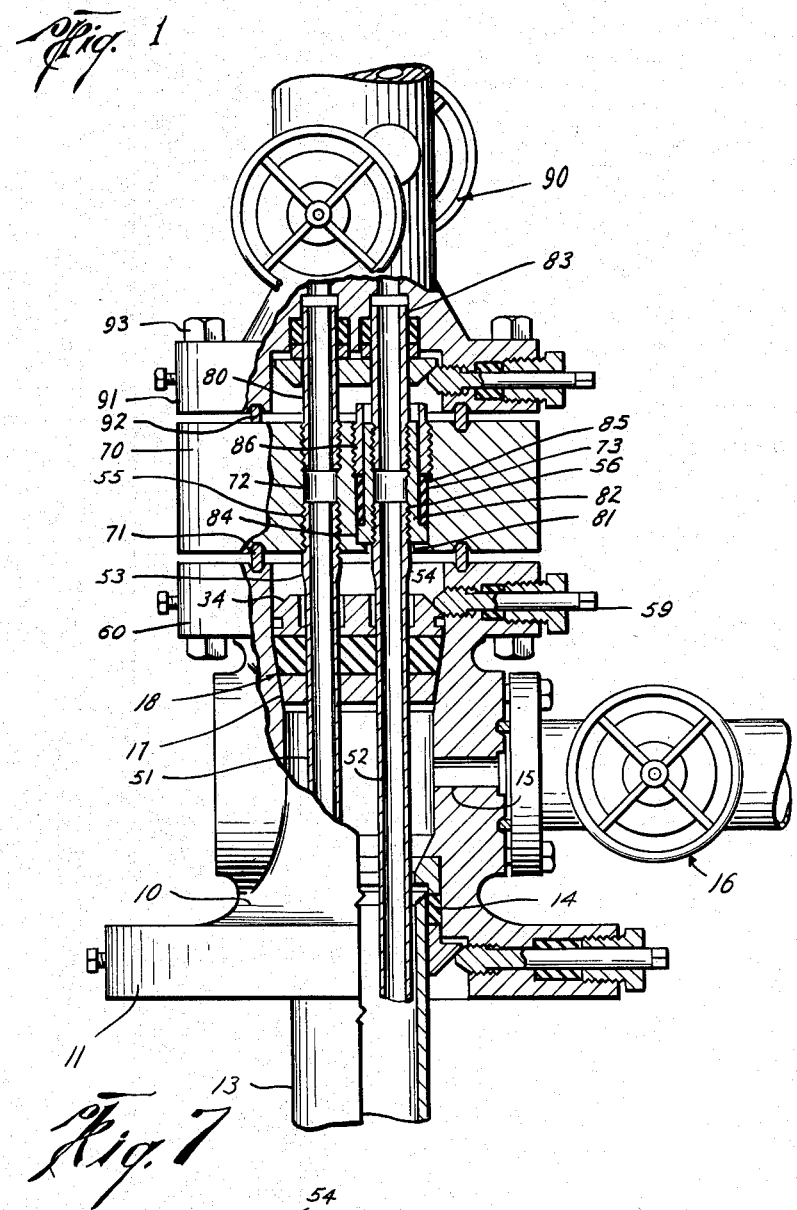

Referring now to FIGURE 1, there is shown the lower section of a well completion apparatus comprising a tubing head 10 adapted to be supported on and connected to a casing head (not shown) by flange 11. The upper end of a casing 13 is sealed within the lower end of the tubing head by seal 14. This seal is described more fully in United States patent application Serial Number 336,958, filed February 16, 1953, by Andrew C. Oden and J. C. Shuptrine, entitled Interchangeable Tubing Head Seal and Casing Hold-down and Tool Guide.

The tubing head is provided with outlet port 15 to which a valve 16 is connected to control flow from the casing annulus.

The upper end of tubing head 10 is provided with a tapered bowl 17 within which is seated a dual bore wrap around tubing seal 18 which is shown in detail in FIGURES 3, 4, and 5. As there shown the seal comprises a ring of sealing material 21 having a conical external surface 22 and two parallel cylindrical passages or ports 23, 24 centered on a vertical diametral plane therethrough. The seal ring is split vertically at 25 between outer surface 22 and port 24 and at 26 between ports 23 and 24, the material between port 24 and surface 22 providing a hinge since the ring is made of rubber or similar material that is flexible and that makes a good seal.

Ring 21 is held between upper and lower split metal rings 31, 32 to which it is vulcanized or in other manner secured. Ring 31 has a lower cylindrical outer portion 33 and an upper conical portion 34. It has two ports 35, 36 therethrough aligned with ports 23, 24. Ring 31 is split at 37, 38, 39 in alignment with splits 25, 26. The two halves of ring 31 are connected at one side by hinge 40 and at the other by latch 41. Ring 32 has a tapered outer surface 42 and two ports aligned with ports 24 and 25 and is split clear across on a vertical diametral plane aligned with splits 25, 26. It will be noted that seal 18 is split along a vertical diametral plane defined by the axes of the vertical passages therethrough.

Referring again to FIGURE 1, two sections of tubing 51, 52, constituting the upper portions of two tubing strings, extend up through seal 18. The upper ends of these tubing sections are upset at 53, 54 to provide material for threads 55, 56. In order that seal 18 may be as close as possible to the ends of the tubing sections, the ports 35, 36 are counterbored to provide enlarged portions 57, 58 into which the upset ends 53, 54 can freely enter. Seal 18 is locked in place and compressed by screws such as 59 passing through flange 60 of the tubing head and engaging with conical surface 34.

Mounted on flange 60 is a suspension ring 70, which is sealed to flange 60 by a steel ring gasket 71. Ring 70 has two bores 72, 73 centered on a diametral plane and adapted to be aligned with tubing sections 51, 52. Bore 77 is threaded at its lower end to receive thread 55 of tubing section 51 and at its upper end to receive tubing nipple 80.

Bore 73 is provided with an inturned flange 81 at its lower end to support a pipe coupling 82 which is threaded at its lower end to receive thread 56 of tubing section 52 and at its upper end to receive tubing nipple 83. The exterior of coupling 82 has a smaller diameter than bore 73 except for a flange 84 at its lower end which is slidable within bore 73 and centers the coupling. A packing 85 between bore 73 and coupling 82 is compressed by a ring 86 screwed into a threaded counterbore in the upper end of bore 73.

The above described connection of tubing sections 51, 52 to suspension ring 70 enables one of the tubing sections to be connected to the ring by a simple threaded connection which occupies a minimum of radial space. The other connection cannot be the same since the ring cannot be rotated to couple it to the other tubing section once it has been screwed onto the first tubing section and since the long tubing string cannot easily be rotated. The second tubing string is therefore hung on a coupling and packed off, providing a suspension which does not require rotation of either the tubing or the suspension ring. Although this type of suspension requires a larger radial extent than the threaded suspension, there is still sufficient metal between the two suspensions to provide adequate strength, since the simple threaded connection does not take up much room, extending radially only the depth of the thread.

Figure 7:
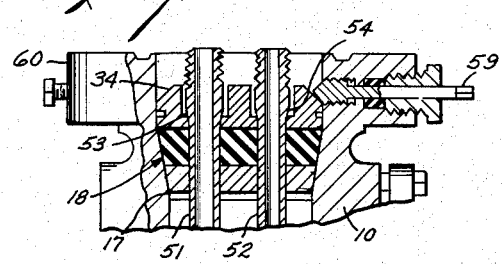
FIGURE 7 is a partial side elevational view of the lower portion of the apparatus shown in FIGURE 1, the tubing strings being lowered to rest on the packoff at their upset upper ends.

In FIGURE 7 of the drawings, the tubing strings 51, 52 are shown with their outwardly upset ends at rest within the upper counterbores of the packoff 18 which also serves as a temporary or intermediate hanger for the tubing strings during assembly of the apparatus. Tubing string 51 is first lifted from the position shown in FIG. 7 to be directly connected to hanger or ring 70 at threads 55 (see FIG. 1) and then, after ring 70 has been placed on top of flange 60 of tubing head 10 with the other opening of ring 70 aligned above tubing string 52, tubing string 52 is lifted to be indirectly connected to ring 70 as has been described.

Mounted on top of ring 70 is dual valve 90 which has a lower flange 91 sealed to the ring 70 by a steel ring gasket 92. Flanges 91 and 60 and ring 70 are held together by through bolts such as 93. If valve flange 91 is of smaller diameter than tubing head flange 60, an adapter flange may be substituted for ring 70.

Figure 2:
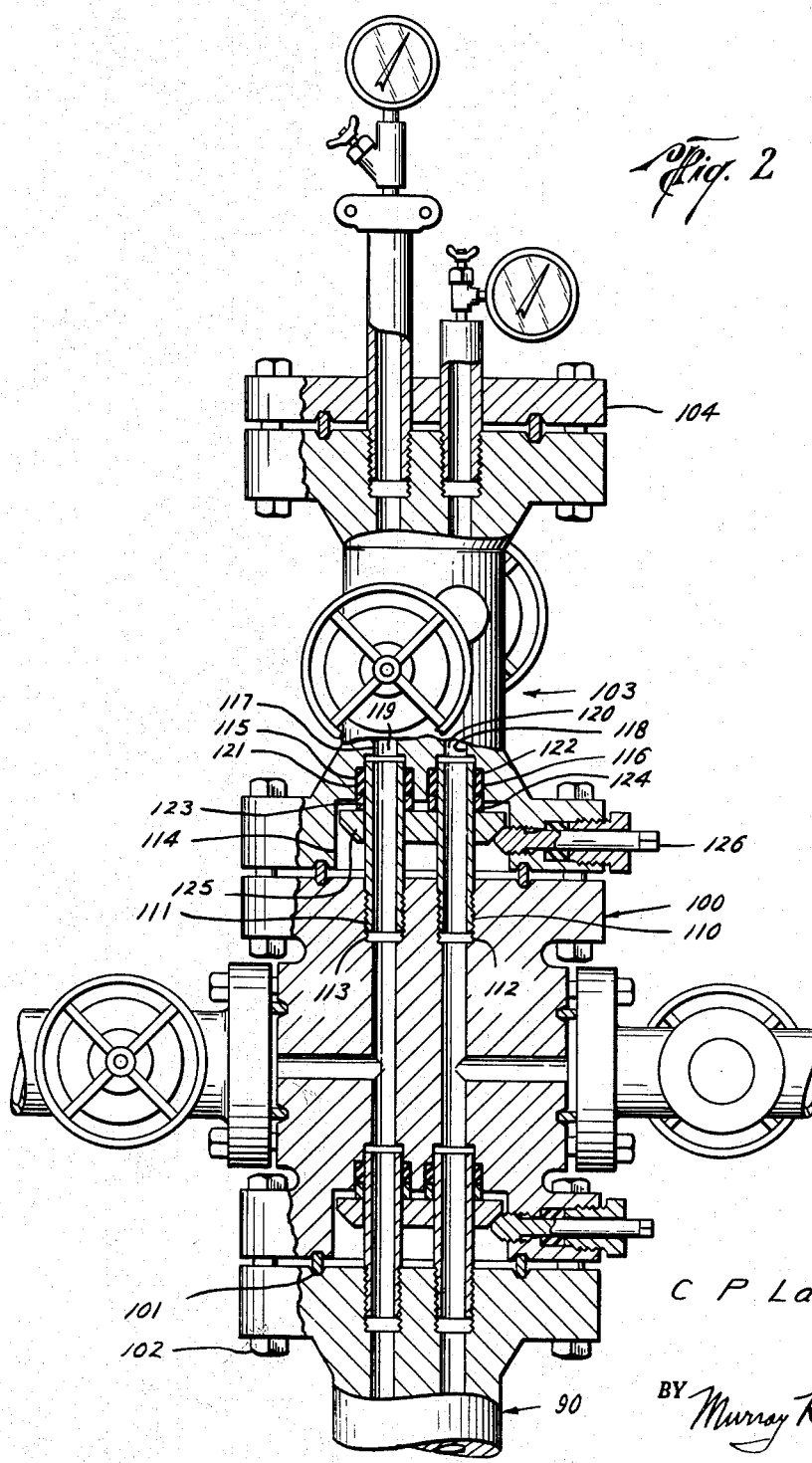

The dual valve 90 may be of any desired type. Preferably it comprises two automatic plastic sealed gate valves of the type described in United States Patents 2,317,657 issued April 27, 1943, entitled "Conduit Valve" and 2,433,638 issued December 30, 1947, entitled "Automatic Lubricate Valve," the two valves being disposed in a unitary housing as shown in FIGURES 1 and 2 hereof.

On top of valve 90 is disposed a dual T 100, the lower flange of the T being sealed to the upper flange of valve 90 by ring 101 and held in place by through bolts 102. On top of T 100 is another dual valve 103 similarly sealed and bolted, and the top of valve 103 covered with a protecting plate 104 sealed and bolted thereto in like manner.

In order to provide connections between the dual bores of ring 70, valve 90, T 100, and valve 103, there are provided connecting means comprising pipes and seals which are the same in each case so that only the connection between T 100 and valve 103 will be described. It comprises two pipes 110, 111 screwed into counterbores 112, 113 in the top of the T. The pipes extend up into single counterbore 114 in the bottom flange of valve 103 and thence into two smaller counterbores 115, 116 in the body of the valve and finally into two still smaller counterbores 117, 118, all concentric with flow passages 119, 120 of the valve. Packing 121, 122 in counterbores 115, 116 and around the pipes 110, 111, is adapted to be compressed by gland rings 123, 124, which in turn are pushed upwardly by dual bore compression ring 125, which is forced upwardly by a plurality of screws 126 disposed around the periphery of the valve flange. It will be seen that this type of connection allows the upper unit, that is, valve 103, to be placed on top of the lower unit, that is, T 100, and thereafter the two pipes sealed to the two bores of valve 103 by tightening the lock screws 126. If desired, the connection could be reversed by screwing the pipes into the upper member and telescoping and packing them in the lower member.

Referring now to FIGURE 6 there is shown a modification of the apparatus shown in FIGURE 1. The apparatus is generally similar in that it includes the same tubing head 10 having a flange 11 resting on top of a casing head 12 in which a casing 13 is suspended. Also, the upper end of the casing is sealed in the tubing head at 14. The principal difference lies in the omission of suspension ring 70, the valve 90 being disposed directly on top of the tubing head. Instead of suspending the tubings 151 and 152 in a suspension ring, they are suspended in a hanger 153.

The hanger 153 is of circular cross-section and has a tapered or conical seat 154 adapted to rest on tapered bowl 17 of the tubing head. A plurality of packing rings 155, 156 are compressed and the hanger is held in place by means of lock screws 59, the same as seal 18 of the FIGURE 1 embodiment is compressed and held in place.

The hanger 153 is provided with two passages therethrough, similar to seal 18. However, one of the passages 160 is threaded at its upper and lower ends to receive the top of tubing 151 and the lower end of pipe nipple 161. The other passage 162 is provided with a series of counterbores to receive coupling 170 screwed onto the top of tubing 152, packing 171 around the coupling, and compression ring 172 on top of the packing, the counterbore for ring 172 and the ring itself being screw threaded.

A pipe nipple 173 is screwed into the top of coupling 170. The upper ends of pipes 161 and 173 may be sealed within valve 90 by means the same as shown in FIGURE 1 or they can be sealed by the modified arrangement shown in which a single dual bore packing 180 having an outer diameter the same as that of dual bore compression ring 125 is compressed against the lower face 181 of the body of valve 90, being held within counterbore 182. Lock screws 126 force ring 125 upwardly the same as in the FIGURE 1 embodiment.

Comparing the embodiments of FIGURES 1 and 6, it will be noted that in both embodiments the suspension means, ring or hanger is screwed onto one of the tubings, by rotating the suspension means around the tubing and the other tubing string is hung in the suspension means on a coupling. This coupling is preferably of larger diameter than the couplings used in the rest of the tubing string so that the tubing can be run through the suspension means.

Differences between the FIGURES 1 and 6 embodiments appear in comparing the setting of the tubing strings. With the FIGURE 1 embodiment, the first string of tubing is run through the usual blowout preventers mounted on top of the tubing head and a temporary dual bore hanger similar to the lower plate of the seal is wrapped around the tubing and dropped through the preventers into the bowl of the tubing head. That string of tubing is then suspending by a coupling resting on top of the hanger. Then the other string of tubing is run through the preventers and an enlarged bore in the hanger and finally suspended in the hanger by an enlarged coupling. The preventers are then removed and the first of tubing is lifted out of the hanger and the suspension ring screwed thereon. Then the other tubing string is lifted and run through the adapter flange and connected therein. The temporary hanger is removed from the bowl of the tubing head and the seal is substituted therefor and the suspension ring is placed on top of the tubing head and the rest of the tree assembled thereon.

In the FIGURE 6 embodiment the temporary hanger is eliminated. After the first string of tubing is run the permanent hanger is screwed onto the tubing and lowered into the bowl. Then the second string of tubing is run through the preventers and the enlarged opening of the hanger and finally an enlarged coupling is seated in the hanger. The well can thus be placed under the full control before the preventers are removed and the rest of the tree assembled on top of the tubing head. With this construction when the well is to be reworked the tree can be removed clear down to the tubing head and workover preventers placed on top and then the strings can be pulled through the preventers.

While preferred embodiments of the invention have been shown and described, many modifications thereof can be made by one skilled in the art without departing from the spirit of the invention, and it is desired to protect by Letters Patent all forms of the invention falling within the scope of the following claims.

I claim:
1. Well completion apparatus, comprising a well head having a vertical opening therethrough, a seat around the sides of said opening for supporting an intermediate hanger, an intermediate hanger disposed in said vertical opening and supported on said seat, said intermediate hanger having a pair of vertical side-by-side tubing passages therethrough and having a vertical split thereacross through said tubing passages whereby said intermediate hanger may be placed about a pair of tubing strings having outwardly upset upper ends with said tubing strings in said tubing passages from laterally of said tubing strings disposed parallelly side-by-side in a well whereby said tubing strings may be lowered to rest said upset upper ends of the tubing strings on said intermediate hanger, a hanger body having vertical bores therein adapted to axially align with said tubing passages supported upon said well head and one of said vertical bores being adapted for direct connection with one of said tubing strings and the other of said vertical bores being adapted for indirect connection to the other of said tubing strings, whereby one of said tubing strings may be lifted to elevate its upset upper end from its position of rest on said intermediate hanger and to directly connect said hanger body thereto after which the other tubing string may be lifted through its related bore to elevate its upset upper end from its position of rest on said intermediate hanger and to be thereafter indirectly connected to said hanger body.

2. Tubing suspension apparatus for parallel string dual completion wells, comprising a hanger body adapted for support by a tubing head on a well and having a pair of parallel vertical bores therethrough, said hanger body being sealingly connected to said tubing head, one of said bores being threaded at its lower and upper ends and thereby adapted for direct connection with the upper end of a first tubing string and adapted to receive a flow nipple at its upper end, the other of said bores being large enough for free movement of a second tubing string including the enlarged couplings of the tubing string therethrough and having an upwardly facing shoulder means, tubing support means adapted to be connected to the upper end of said second tubing string extending through said other bore and being incapable of being passed downwardly through said other bore past said shoulder means whereby said second tubing string is indirectly connected to said hanger body by motion of translation of said second tubing string to move said tubing support means into said other bore and to seat said tubing support means on said shoulder means, said tubing support means having vertical passage means therethrough and being adapted to receive a flow nipple at its upper end.

3. Combination of claim 2, said hanger body being of flat disc form and having a substantially circular horizontal cross section, the peripheral portion of said hanger body having circularly spaced vertical bolt holes therethrough for bolting the hanger body disposed above said tubing head to the upper flange of the tubing head, said pair of bores of said hanger body being surrounded by said peripheral portion of said hanger body.

4. Combination of claim 2, said hanger body being telescopically insertable in said tubing head and having a downwardly facing seating surface therearound adapted for seating against a shoulder in the bowl of said tubing head.

References Cited by the Examiner
UNITED STATES PATENTS

| | | | |
|---|---|---|---|
| 344,137 | 6/86 | Royce | 285—131 |
| 1,431,779 | 10/22 | Conrader. | |
| 2,001,946 | 5/35 | Tschappat | 285—148 |
| 2,153,852 | 4/39 | Tschappat | 285—148 |
| 2,223,702 | 12/40 | Penick | 285—140 |
| 2,335,355 | 11/43 | Penick. | |
| 2,550,027 | 4/51 | Thompson | 285—137 |
| 2,610,689 | 9/52 | Eckel | 285—143 |
| 2,617,485 | 11/52 | Thatch | 285—148 |
| 2,768,841 | 10/56 | Allen | 285—143 |
| 2,829,597 | 4/58 | Patterson | 285—140 |
| 2,850,099 | 9/58 | Brown. | |
| 2,903,066 | 9/59 | Brown | 166—46 |
| 2,965,173 | 12/60 | Brown | 166—46 |
| 3,001,803 | 9/61 | Watts et al. | 285—137 |
| 3,020,069 | 2/62 | Word | 285—137 |

OTHER REFERENCES

"The National Supply Co.—Bulletin No. 374," copyright, 1951, The National Supply Co., Toledo, Ohio.

CARL W. TOMLIN, *Primary Examiner.*

BENJAMIN BENDETT, *Examiner.*